Sept. 1, 1959 F. M. POOLE 2,901,830
MEASURING INSTRUMENT
Filed March 17, 1954 4 Sheets-Sheet 4
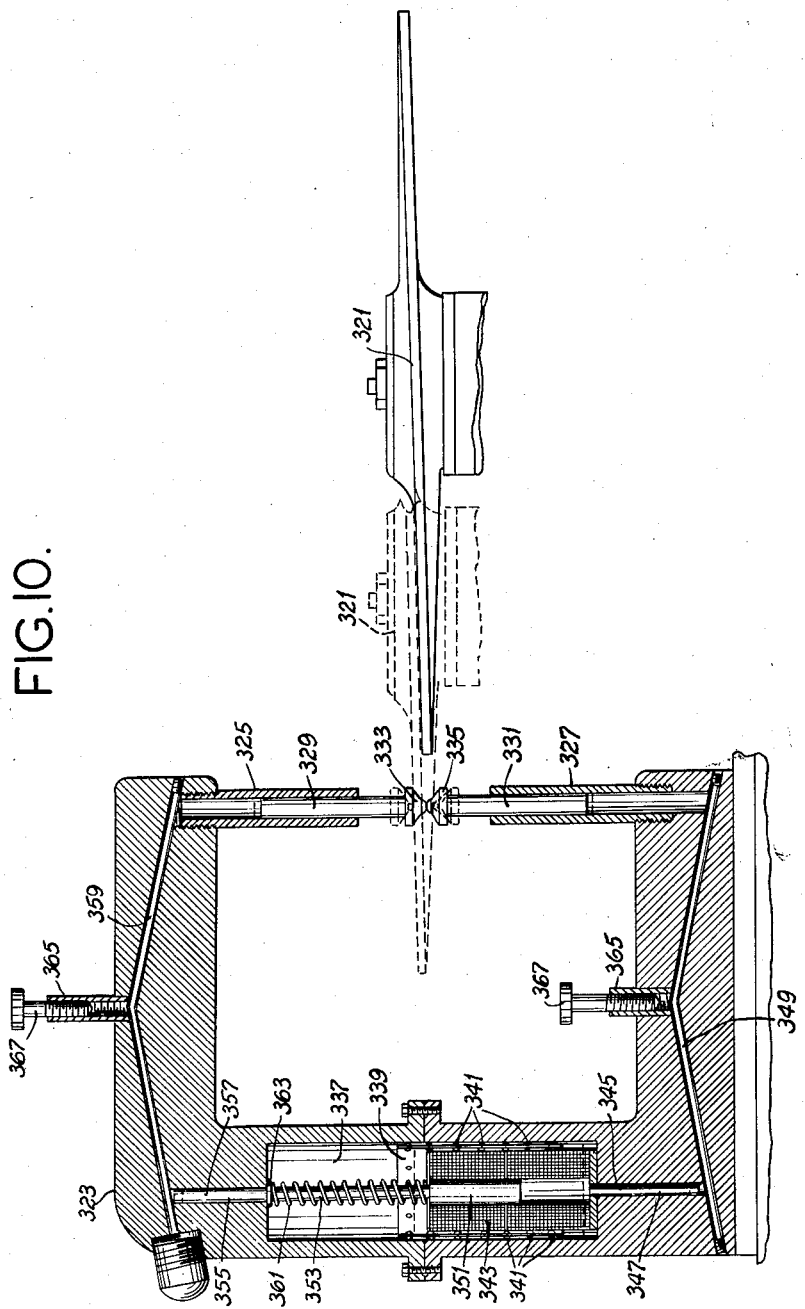

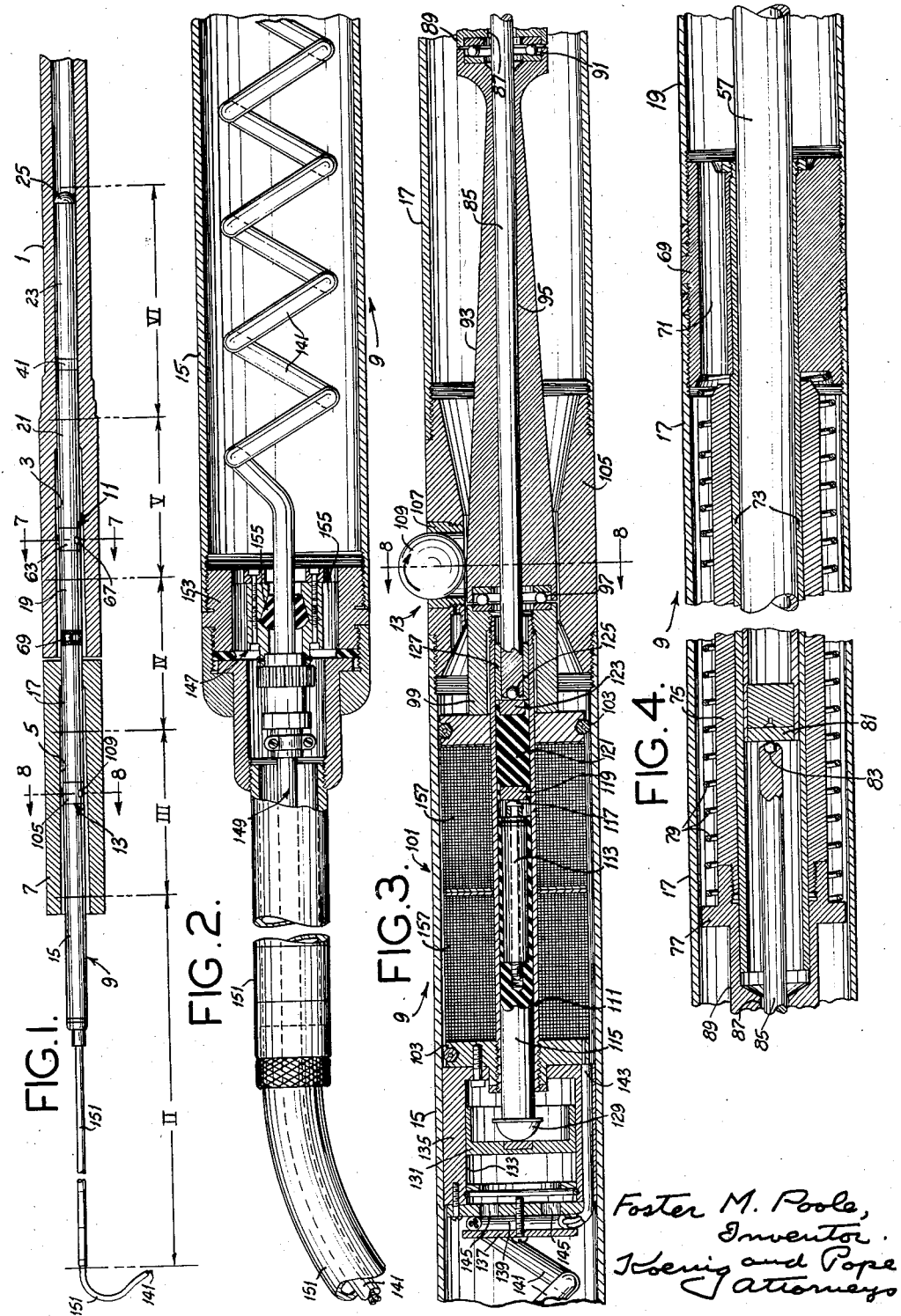

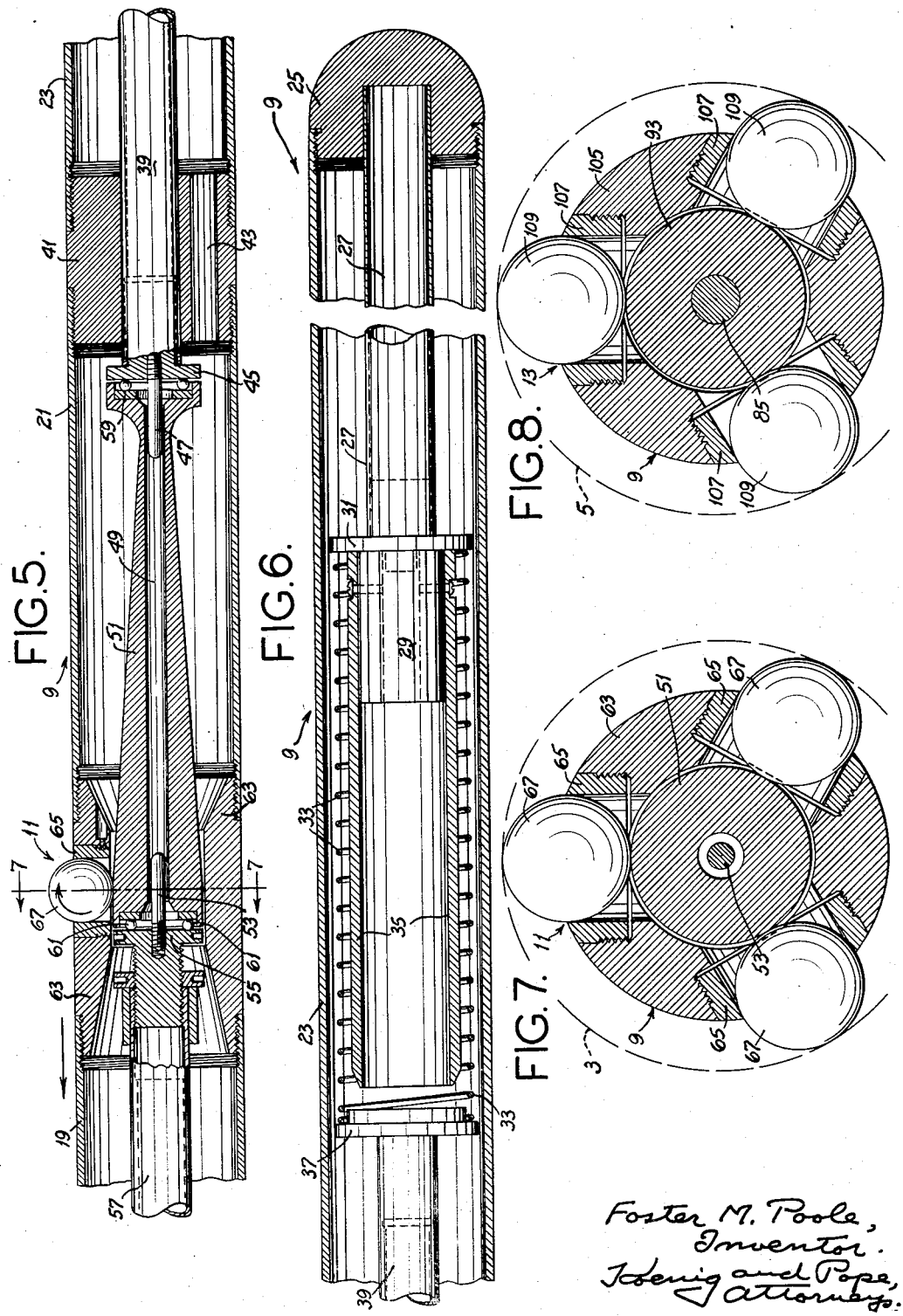

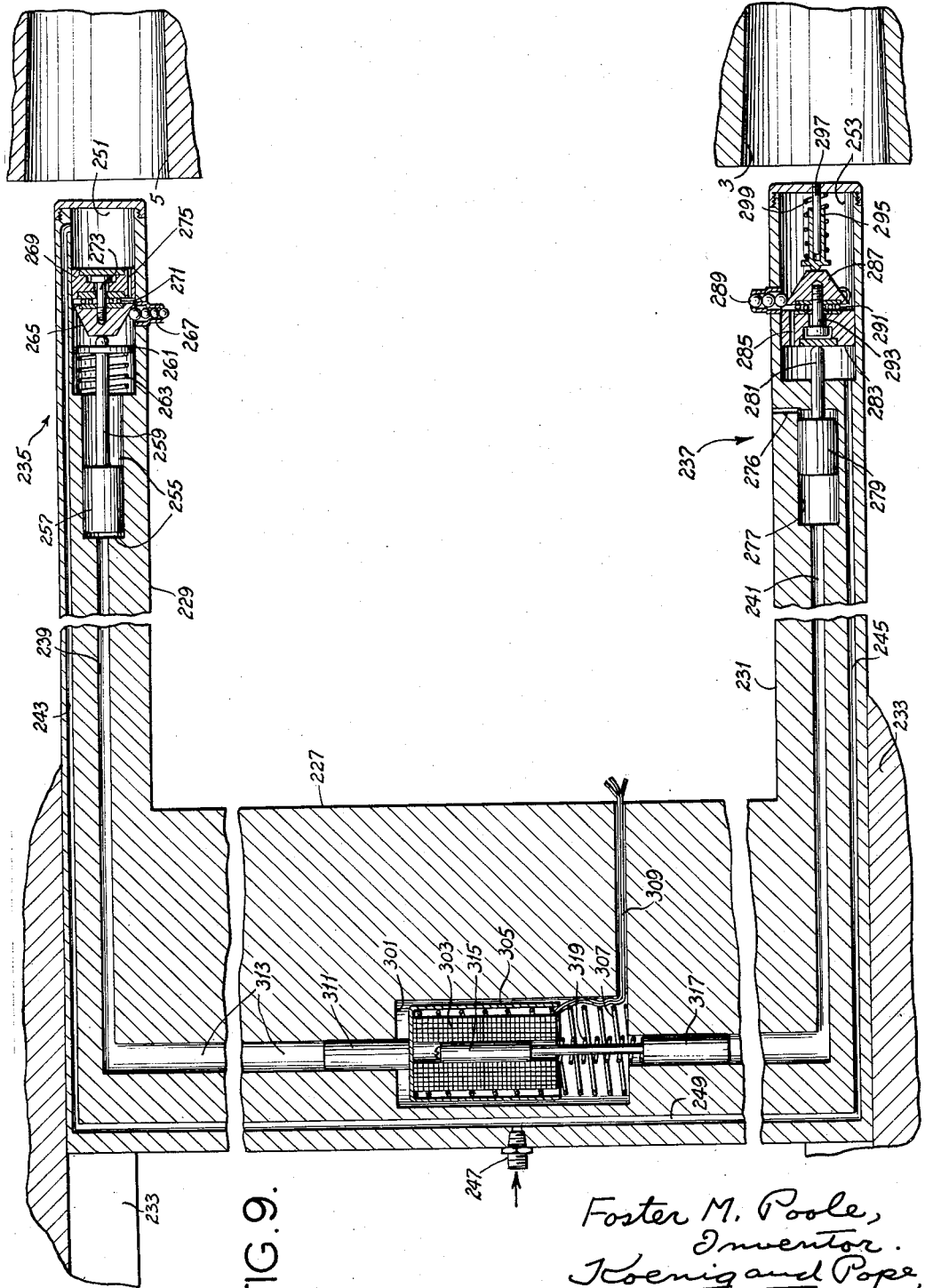

United States Patent Office 2,901,830
Patented Sept. 1, 1959

2,901,830

MEASURING INSTRUMENT

Foster M. Poole, University Park, Tex., assignor of one-half to Carl Casey, Dallas, Tex.

Application March 17, 1954, Serial No. 416,931

1 Claim. (Cl. 33—174)

This invention relates to measuring instruments, and with regard to certain more specific features, to feeler type taper gauges.

Among the several objects of the invention may be noted the provision of a taper gauge having feeler means for detecting dimensional variations between two relatively fixed surfaces, with improved means preventing the introduction of error due to variations in the positional relationships of the surfaces with respect to the measuring instrument; the provision of a taper gauge of the continuously reading type adapted to exhibit deviations in taper of a sample workpiece with respect to taper of a master piece of standard form; the provision of a taper gauge adapted for measuring varying thicknesses or taper of irregular objects; and the provision of measuring apparatus of this class which is simple to construct for reliable operation with accurate results. Other objects and features will be in part apparent and in part pointed out hereinafter.

Briefly, the invention comprises a framework constituting an exploring member having at least two detector devices movable with respect to the framework and adapted to be engaged with articles to be measured. An electrical coil assembly is movable relative to the framework and is adapted to produce a magnetic field. This coil assembly has a first motion-transmitting means connecting it with one of the detector devices. An armature is also movable relative to the framework and within the range of the magnetic field produced by the coil assembly. A second motion-transmitting means connects this armature with the other detector device. Thus by engaging the detector devices with the object or objects to be measured, motion may be transferred from the detector devices to the coil assembly and armature respectively. The coils of the coil assembly transmit signals, being located in a known type of A.C. reactance bridge circuit having an indicating receiver set for null position for a given position of the armature relative to the coil assembly. When the coil assembly and armature move in the same direction at the same speed, a null (i.e., no) signal is transmitted to the receiver; but when they move in opposite directions or in the same direction at different speeds, then the electrical balance of the bridge circuit is destroyed, and a positive signal produced, with a resulting deviation from the null signal at the receiving device. The present invention relates to the mechanical improvement whereby neither the coil assembly nor armature is stationary, with the resulting advantage that comparative (as distinguished from absolute) measurements may be made, with certain attendant advantages.

The invention accordingly comprises the elements and combinations of elements, features of construction, and arrangements of parts which will be exemplified in the structures hereinafter described, and the scope of which will be indicated in the following claims.

In the accompanying drawings, in which several of various possible embodiments of the invention are illustrated, Fig. 1 is a diagrammatic longitudinal section of a form of the invention adapted for comparative coaxial breech chamber measurements on guns;

Fig. 2 is a longitudinal section of portion II of Fig. 1;
Fig. 3 is a longitudinal section of portion III of Fig. 1;
Fig. 4 is a longitudinal section of portion IV of Fig. 1;
Fig. 5 is a longitudinal section of portion V of Fig. 1;
Fig. 6 is a longitudinal section of portion VI of Fig. 1;
Fig. 7 is a cross section taken on line 7—7 of Figs. 1 and 5;
Fig. 8 is a cross section taken on line 8—8 of Figs. 1 and 3;
Fig. 9 is a diagrammatic view of a second and alternative form of the invention applicable to measurements of noncoaxial breech chambers of guns; and,
Fig. 10 is a cross section of a third and alternative form of the invention applicable to thickness measurements on irregular objects.

Corresponding reference characters indicate corresponding parts throughout the several views of the drawings.

Referring now more particularly to Fig. 1 of the drawings, numeral 1 indicates, as an example, a gun barrel having a breech chamber or bore 3 to be sampled, the taper of which it is desired to compare with the taper of a master breech chamber or bore 5 of a master breech block 7. The chambers 3 and 5 are suitably mounted in substantial coaxial relationship, the accuracy of alignment being noncritical.

In general, the first form of my invention shown in Figs. 1–8 consists of a built-up exploring member or cylinder 9 adapted to be introduced through chamber 5 and into 3, so as initially to locate feeler or detector devices 11 and 13 at the far (right-hand) ends of breech chamber 3 and master breech chamber 5, respectively. These are later to be drawn to the left. This introduction is effected with the surface detecting elements of the feeler members 11 and 13 in radially retracted positions. Provision is made for radially moving these detector members into surface engagement, after the instrument has been introduced as far as desired into the chambers 3 and 5. Thereafter the instrument is drawn out and comparative taper measurements obtained in the manner described below.

The details of cylinder 9 and connected parts are shown in Figs. 2–6, corresponding to portions II—VI of Fig. 1, and also in the cross sections of Figs. 7 and 8. Cylinder 9 is built up of five subcylinders 15, 17, 19 21 and 23 (Figs. 1–6). At the extreme end of cylinder 23 (Fig. 6) is a cap 25 forming a pilot nose. Attached to the inside of the cap 25 is a rigid column 27 supporting a thimble 29 and flange 31. This serves as a reaction point for the right-hand end of a compression spring 33. Attached to the thimble 29 is a guide sleeve 35 for the spring 33.

The left end of the spring is engaged by a platform 37 of a first spaced column 39 (Figs. 5 and 6). This column is slidably supported in a coupling 41 joining cylinders 21 and 23. The coupling contains a passage 43 connecting the cylinders 21 and 23. The column 39 is provided with a flat-faced platform 45 within cylinder 21. From this extends a pin 47. The pin 47 extends loosely into an axial hole 49 within a first cone 51. A second pin 53, located at the opposite end of the hole 49, extends from a flat-faced platform 55 attached to a second spacer column 57 in the cylinder 19. Flat-faced ball thrust bearings 59 and 61 are located at opposite ends of the cone 51 and bear against the flat platforms 45 and 55, respectively. The cone 51 is thus supported in a freely floating position between the platforms 45 and 55 by means of the pins 47 and 53 and by the bearings 59 and 61. It will be understood that the balls of the thrust bearings 59 and 61 are in the usual ball-holding cages, not shown by reason of the small scale.

Cylinders 19 and 21 (Figs. 4 and 5) are joined by a coupling 63 through which the cone 51 passes. This coupling 63 carries three bushings 65, located at intervals of 120° in a plane at right angles to the bushing axis (Fig. 7). The bushings 65 hold captive, while allowing rotation of, feeler balls or article-shape detector members 67, with which the cone 51 engages internally.

Cylinders 17 and 19 (Figs. 3 and 4) are joined by a coupling 69 (Fig. 4), having a passage 71 connecting the cylinders. Anchored centrally in the bushing is a hollow guide post or bushing 73 within which said second column 57 may slide. Around the post 73 is located a slider 75 carrying on its left end a flange 77. A compression spring 79 reacts between the flange 77 and the coupling 69.

At its end within the bushing 73, the column 57 carries a flat anvil 81 which is engaged by a ball 83 held captive in a rotary manner in the end of a spacer stem 85. The stem 85 passes loosely through an opening 87 in a spacer cylinder 89 which carries the flange 77. This spacer cylinder has a flat-faced ball bearing engagement (see end-thrust bearing 91) with the right-hand end of a second cone 93 (Fig. 3) having an opening 95 through it for loosely supporting the cone upon the stem 85. The left end of the cone 93 has a flat-faced ball bearing engagement (see end-thrust bearing 97) with a projection 99 from a transmitter coil assembly 101 which is movable within the cylinder 15 on guide members 103. The thrust-engaged members 99 and 93 extend through a coupling 105 connecting cylinders 15 and 17. This coupling 105 contains in a plane normal to its axis three 120° spaced bushings 107 (Fig. 8). The bushings 107 hold captive, while allowing rotation of, feeler balls or article-shape detector members 109 with which the cone 93 engages internally.

The coil assembly 101 (Fig. 3) carries a central tubular bushing 111 in which slides a ferromagnetic armature 113. The armature 113 is mounted in an insulating body 115, the latter being slidable in the bushing 111. Extending from the armature 113 is an abutment 117, engaging an anvil 119 in an insulating slider 121 in the bushing 111. This slider 121 carries an anvil 123 engaging a ball 125 which is rotary but held captive in a socket at the adjacent end of stem 85. An attached collar 127 around stem 85 serves as a slide shoe for the stem within the bushing 111.

At its left end the insulating body 115 has threaded to it a metal head 129 with which a piston 131 engages. The piston 131 slides within an internal cylinder 133 of a second hollow piston 135. Piston 135 slides within the cylinder 15. Piston 135 is attached to the coil assembly 101. On its left end (Fig. 3) it carries a clamp 137 for the end 139 of a helical coil of electric cable 141. As indicated at 143, the wires of the cable are connected to the coil portions of assembly 101. Holes 145 connect the space within cylinder 15 to the cylinder 133.

The helical cable 141 emerges (Fig. 2) from the cylinder 15 through a gland 147 and (as shown at 149) passes into a connected flexible air-pressure line 151. The gland is screwed to an end coupling 153 which has openings for transmitting air under pressure from the air line 151 to the cylinder 15. At 155 is shown an insulating chuck assembly for centering the parts of the cable 141 that emerge into the air line 151.

The coil assembly 101 consists of two bridge coils 157 connected with an indicating impedance bridge circuit and recording apparatus such as shown in Fig. 10 of my U.S. Patent 2,348,643. From an electrical viewpoint, coils 157 herein are comparable to coils 161 in said patent and the armature 113 herein functions electrically, as does the armature 123 in said patent. Mechanically, however, the coils 161 of the patent are anchored, whereas in the present case the coils 157 are movable with respect to the device as a whole. In both cases, whenever the armature 113 moves relatively to the coils 157, an unbalanced electrical condition is set up in the bridge circuit which serves to provide a reading of deviations from a norm. When, as herein, both the armature 113 and the coils 157 moves together in the same direction at the same speed, without relative motion, then no deviation signal results. But a signal does result when the movements of the coils and armature herein are different in magnitude or direction or both.

Further description of the electrical transmitting signaling system, and the receiving mechanism for recording deviations, will not be necessary because one example is clearly disclosed in my said patent. Moreover, the electrical signaling system is not claimed herein per se. In addition, other electrical systems than those shown in said Patent 2,348,643 may be employed for transmitting and receiving purposes, such as, for example, in U.S. Patent 2,503,868.

The novel mechanical operation of the form of the invention shown in Figs. 1–8 is as follows:

An A.C. voltage is applied to the wires of cable 141, thus exciting coils 157 in any of their possible positions within the cylinder 15. Air pressure is introduced over the air line 151 into cylinder 15. This biases pistons 131 and 135 to the right and likewise the coil assembly 101 and armature 113, respectively. However, the air is not turned on until the cylinder 9 has been introduced through the master breech chamber 5 into the sample gun barrel 1. This places the feeler or detector members 11 and 13 the maximum depth desired into the breech chamber 3 and master breech chamber 5, respectively. Then when the air is turned on, the cone 93 is biased toward the right against spring 79 and presses the feeler balls 109 out against the walls of the master breech chamber.

As to the armature 113, when it is biased toward the right under air pressure it transmits motion through stem 85 and column 57 to the cone 51, which moves the feeler balls 67 out into engagement with the sample breech chamber 3. The reaction for holding cone 51 is provided by the reaction of spring 33 through column 39. Cone 51 is free to float laterally with respect to the pins 47 and 53, bearings 59 and 61 allowing this by reason of their lateral motions on flat platforms 45 and 55.

As to the coil assembly 101, when it is biased toward the right under air pressure on piston 135 it transmits motion through extension 99 to cone 93, which moves the feeler balls 109 out into engagement with the walls of the master breech chamber 5. The reaction for holding cone 93 is provided by the reaction of spring 79 through member 89. Cone 93 is free to float laterally around the stem 85 by reason of the lateral movements allowed by bearings 91 and 97.

After the cones 51 and 93 have caused outward movements of the feeler balls 67 and 109, respectively (as above described), the bridge circuit connected to coils 157 is electrically balanced to a null position and the entire cylinder 9 is retracted to the left, as illustrated in Fig. 1. This rotates clockwise the balls 67 and 109 as they roll on the walls of their chambers. The air pressure which overcomes the action of springs 33 and 79 then forces the cones 51 and 93 through the groups of balls 67 and 109, respectively, as the balls roll outward. The contact movements of the feeler balls on the cones are such that no restrictive clutching action occurs. The result is that the coil assembly 101 and armature 113 move relatively to the right. If the tapers of the two chambers 3 and 5 are the same, then there is no relative motion between the coil assembly 101 and armature 113.

Consequently, no signal is obtained from the impedance bridge circuit to which the coils 157 are connected. This is because without relative movement between coil assembly 101 and armature 113 the connected bridge circuit maintains its balance, thus indicating that the two tapers are alike. If at any position of withdrawal movement of cylinder 9 the tapers of chambers 3 and 5 are different, this will be reflected in different rates of movement of the coil assembly 101 and the armature 113, that is, 101 and 113 will have relative movement. The changed position of the armature 113, with respect to the coils in which an alternating current flows, unbalances the previously balanced bridge circuit, with a resulting signal indicating the difference.

After withdrawal of the device 9 as a whole, air pressure is turned off from cylinder 15. The springs 33 and 79 then cause leftward movements of the cones 51 and 93, respectively, thus positioning their smaller ends within their respective groups of feeler balls 67 and 109. The result is that the cylinder 9 may be freely introduced into tapering chambers such as 3 and 5 for a succeeding measurement, the balls 67 and 109 being then freely movable inwardly. Air pressure is then again turned on for a succeeding cycle of measurements.

In Fig. 9 is shown an alternative form of the invention in which a substantially parallel master breech chamber 5 is located adjacent to the breech chamber 3, instead of substantially coaxial therewith, as in Fig. 1. In this case the exploring assembly is constituted by a body portion 227 from which extend parallel exploring arms 229 and 231, generally in the form of cylinders upon substantially parallel axes, spaced for insertion of arms 229 and 231 into the bores 5 and 3, respectively. Suitable guides parallel to the axes of these bores are employed for the purpose of guiding the action. The guides are indicated diagrammatically at 233.

The arms 229 and 231 have exploring heads 235 and 237, respectively, in which are hydraulic fluid passages 239 and 241, respectively; also air passages 243 and 245, respectively. Air pressure may be supplied as desired to passages 243 and 245 from an inlet fitting 247. This occurs by way of a connecting air passage 249. The air passages 243 and 245 supply air to counterbores 251 and 253 of the heads 235 and 237, respectively.

A stepped bore 255 communicates with the hydraulic passage 239 and contains a piston 257. The piston is on a stem 259 having a flange 261 normally biased to the right by means of a spring 263. The end of the stem 259 engages a floating cone 265 which is positioned within a group of three article-shape detectors or feeler ball assemblies 267, located at 120° intervals around the head 235. Only one assembly appears in Fig. 9, but it will be understood from the arrangement shown in Figs. 7 and 8 how the three assemblies are positioned.

Adjacent the cone 265 is a piston 269. Between the cone 265 and piston 269 is a thrust bearing 271. This bearing is positioned around a bolt 273 threaded to the cone 265 and passing loosely through a relatively large hole in the piston 269. The loose connection and the thrust bearing 271 allow lateral play of the cone with respect to the center line of the cylinder. Therefore, excessively close axial relationships need not be maintained between the center line of counterbore or cylinder 251 and the master breech chamber 5. A bleeder hole 275 passes through the piston 269.

Referring to the head 237, the hydraulic passage 241 connects with a stepped bore 277 in which is a hydraulic piston 279 having a stem 281. Behind the piston is an air vent 276, preventing entrapment of air behind the piston. The stem 281 engages a piston 283 in bore 253. A bleeder passage 285 passes through the piston. Adjacent to the piston 283 is a cone 287 which has the same slope as cone 265 but reversed in position. This cone cooperates with three article-shape detectors or feeler ball assemblies 289, spaced at 120° intervals around the head 237. There are three feeler balls in each assembly 289; whereas there are four feeler balls in each assembly 267. The reasons for this difference are the reverse slopes of cones 265 and 287, it being desired that as the balls of the ball assemblies 267, 289 rotate upon retraction of the heads 235 and 237 from the bores 5 and 3, the innermost ball on the respective cone rotates so as not to exert a restrictive clutching action with respect to its respective cone.

Between the cone 287 and piston 283 is an end thrust bearing 291 which allows of lateral play between the cone and piston. In this connection again a bolt 293, extending from the cone 287, passes through a relatively large opening in the piston. In order to press the cone 287 toward the piston 283, there is provided a sleeve 295 which telescopes a fixed stem 297 and is spring biased toward the cone by spring 299.

Referring again to the body portion 227, it includes a container 301 in which is located a transmitter coil assembly 303 (similar to coil assembly 101, already described). This assembly is carried in a movable cylinder 305, slidable in the container 301. The axis of the coil and cylinder 305 being vertical, a counterbalancing spring 307 is employed. The wire connections from coil assembly 303 to the indicated mechanism are shown at 309.

The cylinder 305 carries a plunger 311 slidable in a cylinder 313, the latter communicating with passage 239. Movable within the coil assembly 303 is ferromagnetic armature 315, connected with a plunger 317. A spring 319 tends to bias apart the coil assembly 303 and armature 315. Both hydraulic pistons 257 and 279 are of equal diameters and larger than the equal diameters of plungers 311 and 317. Thus linear motions which are hydraulically transmitted between the piston 257 and plunger 311 on the one hand, and piston 279 and plunger 317 on the other hand, are multiplied.

If the axial motions of pistons 257 and 279 are equal and opposite (as will occur when feelers 267 and 289 traverse equal tapers), the coil assembly 303 and armature 315 will move at the same speed in the same direction without relative movement therebetween. If the opposite velocities of the pistons are different (as will occur when feelers 267 and 289 traverse unequal sections of the tapers), then there will be relative motion between assembly 303 and armature 315.

Draining and filling means for the hydraulic fluid are not shown, but it will be obvious that, by effecting different degrees of fill behind pistons 257 and 279, respectively, any null reference position can be established between the assembly 303 and armature 315.

Operation of the form of the invention shown in Fig. 9 is as follows:

Assume that air at the inlet 247 has been turned off and that the hydraulic passages have been filled. Assume also that at this juncture the arms 235 and 237 have been introduced the full depth into the bores 5 and 3. Then the air is turned on, which forces piston 269 to the left and piston 283 to the right, so that the balls of the feeler assemblies move out into wall-engaging positions. This sets up initial positions for pistons 257 and 279. We now assume that A.C. current is supplied to the coil 303, and that the receiver with which wires 309 are connected so as to indicate null for the relative positions of the assembly 303 and armature 315 thus established. The device is then withdrawn from the bores 5 and 3, whereupon the balls of the feeler assemblies move radially, allowing the cones to progress through the inner ball circles. It may be noted that eccentricity between the center lines of the counterbore or cylinders 251, 253 and bores 5 and 3, respectively, is compensated for by the lateral motion possible between the cones 265, 287 and pistons 269, 283, respectively, without moving the pistons from the longitudinal positions that they would have if the center lines were concentric.

If we assume that the tapers of bores 5 and 3 are the same, then, since the slopes of the cones 265 and 287 are equal and opposite, the pistons 257 and 279 will move equally in opposite directions. In view of their hydraulic connections with the plungers 311 and 317, the latter will move at the same speed in the same direction and the null reading will be maintained. However, should one bore 3 deviate in slope from bore 5 at any point in the withdrawal process, the velocities of pistons 257 and 277 become different. This will be reflected in relative motion between the coil assembly 303 and armature 315. This changes the initially balanced electrical conditions in the coils of the coil assembly, indicated on the receiver (not shown) as a deflection from null. Thus deviations of sample bore 3 from the master bore 5 at any given retraction of the assembly 235 may be noted on the receiver.

It is clear that the sensitivity of the device may be increased by increasing the diameters of pistons 257 and 279 relative to the diameters of the plungers 311 and 317. In other words, the hydraulic links between the pistons and the plungers serve as convenient motion-multiplying means in order to increase mechanical sensitivity.

The passages 275 and 285 admit air through the respective pistons 269 and 283 to the ball detector members 267 and 289, for the purpose of blowing them clear of any foreign matter that they may collect.

In Fig. 10 is shown a third form of the invention made up in general C-shape as a caliper for measuring axial dimensions of bodies of variable axial thicknesses, such as the machine part shown at 321. In this form the body of the exploring device is shown at 323, having hydraulic cylinders 325 and 327 for pistons 329 and 331, respectively. Hardened article-shape detectors or noses 333 and 335 are carried on respective ends of the pistons 329 and 331 for engaging opposite faces of the device such as 321 when inserted between the noses, as indicated by the dotted lines. At 337 is shown a compartment containing a movable cylindric cage 359 for ball bearings 341. These axially guide a coil assembly 343 of the type already described. These bearings allow the device to be used horizontally if desired. The assembly carries a plunger 345 in a cylinder 347, communicating through passage 349 with the cylinder 327.

Movable within the coil assembly 343 is an armature 351, connected through a stem 353 with a plunger 355 in a cylinder 357. Cylinder 357 communicates through passage 359 with cylinder 325. A spring 361 reacts between a shoulder 363 on plunger 355 and the coil assembly 343, tending to bias them apart. This tends also to bias apart the plungers 355 and 345, and through the hydraulic connections 359 and 349 to press the pistons 329 and 331 toward one another. This tends to press the noses 333 and 335 against opposite sides of the piece 321 to be measured. As thickness of the piece increases, the pistons 329 and 331 tend to separate, thus causing relative movements between the coil assembly 343 and armature 351. This results in a signal in the receiving instrument, such as has already been referred to. On the other hand, if while making a measurement the piece 321 should introduce up and down movements together of noses 333 and 335, with respect to the measuring device 323, then the pistons 329 and 331 move together at the same speed in the same direction. The same will be true of the coil assembly 343 and armature 351. Therefore, no deviation from a null signal results from those components of shape (or movement) which are parallel to the axes of 329 and 331, as, for example, helical pitch or axial movement in the exemplary piece 321 shown. On the other hand, thickness variations are indicated, due to resulting spread between members 333 and 335 and resulting relative (opposite) movements between coil assembly 343 and armature 351.

It will be evident that in the form of the invention shown in Fig. 10, no air connections are employed. This figure illustrates a feature which may also be used in connection with the form of the invention shown in Fig. 9. This is the provision of feeder openings 365 at high points in the passages 359 and 349, which permit the escape of air without its entrapment upon filling when the device is held vertically. The threaded plungers 367, after filling, permit of forcing together the detector noses 333 and 335 for a given null position between 343 and 351.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

Measuring apparatus comprising an exploring member constituted by a body portion, substantially parallel cylinders extending therefrom for insertion into master and sample bores which are substantially noncoaxial but parallel, groups of radially movable detectors carried by said cylinders respectively and positioned for locations in the respective bores, a magnetic coil assembly movable in said body portion, an armature located in the body portion and within the field of the coil assembly and having movement parallel to that of the coil assembly, plungers attached to the coil assembly and the armature respectively, pistons respectively in said cylinders, a liquid-filled passage connecting each plunger with a piston, oppositely sloping cones cooperating with the respective detectors, pneumatic means for oppositely biasing said cones for said cooperation, and means connecting each cone with one of said pistons.

References Cited in the file of this patent

UNITED STATES PATENTS

| | | |
|---|---|---|
| 2,122,664 | Terry | July 5, 1938 |
| 2,407,490 | Gregg | Sept. 10, 1946 |
| 2,419,461 | Neff | Apr. 22, 1947 |
| 2,431,363 | Beezley | Nov. 25, 1947 |
| 2,514,847 | Coroniti | July 11, 1950 |
| 2,571,161 | Poole | Oct. 16, 1951 |
| 2,581,495 | Neff | Jan. 8, 1952 |
| 2,622,331 | Haines | Dec. 23, 1952 |
| 2,623,293 | Nebesar | Dec. 30, 1952 |
| 2,675,621 | Mims | Apr. 20, 1954 |

FOREIGN PATENTS

| | | |
|---|---|---|
| 255,457 | Switzerland | Jan. 17, 1949 |